US008356017B2

(12) United States Patent
Akirav et al.

(10) Patent No.: US 8,356,017 B2
(45) Date of Patent: Jan. 15, 2013

(54) REPLICATION OF DEDUPLICATED DATA

(75) Inventors: Shay H. Akirav, Tel Aviv (IL); Lior Aronovich, Markham (CA); Ron Asher, Tel Aviv (IL); Yariv Bachar, Tel Aviv (IL); Ariel J. Ish-Shalom, Tel Aviv (IL); Ofer Leneman, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 12/539,109

(22) Filed: Aug. 11, 2009

(65) Prior Publication Data

US 2011/0040728 A1    Feb. 17, 2011

(51) Int. Cl.
*G06F 7/00*     (2006.01)
*G06F 17/00*    (2006.01)

(52) U.S. Cl. ...................................... 707/692
(58) Field of Classification Search ............... None
See application file for complete search history.

(56) References Cited

U.S. PATENT DOCUMENTS

| | | | |
|---|---|---|---|
| 5,583,995 A | 12/1996 | Gardner et al. | |
| 5,608,865 A | 3/1997 | Midgely et al. | |
| 5,870,759 A | 2/1999 | Bauer et al. | |
| 5,990,810 A * | 11/1999 | Williams | 341/51 |
| 6,889,297 B2 | 5/2005 | Krapp et al. | |
| 7,539,710 B1 | 5/2009 | Haustein et al. | |
| 7,720,796 B2 * | 5/2010 | Wong et al. | 707/639 |
| 2005/0216788 A1 | 9/2005 | Mani-Meitav et al. | |
| 2007/0226413 A1 | 9/2007 | Elliott et al. | |
| 2007/0276833 A1 | 11/2007 | Sen et al. | |
| 2008/0005201 A1 | 1/2008 | Ting et al. | |
| 2008/0013830 A1 | 1/2008 | Patterson et al. | |
| 2008/0263109 A1 | 10/2008 | Patterson | |
| 2008/0288482 A1 | 11/2008 | Chaudhuri et al. | |
| 2008/0294696 A1 * | 11/2008 | Frandzel | 707/200 |
| 2009/0106578 A1 | 4/2009 | Dilman et al. | |
| 2009/0132534 A1 | 5/2009 | Yao et al. | |
| 2009/0132619 A1 | 5/2009 | Arakawa et al. | |
| 2010/0114833 A1 * | 5/2010 | Mu | 707/650 |

OTHER PUBLICATIONS

Zheng et al, Method and Apparatus for Identifying and Eliminating Duplicate Data Blocks and Sharing Data Blocks in a Storage System, n/a, U.S. Appl. No. 11/105,895.*
Message Digest Functions as of Nov. 5, 2009 [Accessed Aug. 9, 2012], Microsoft.com, http://web.archive.org/web/20091105134756/http://technet.microsoft.com/en-us/library/cc962033.aspx.*
Cryotpgraphic hash function as of Apr. 16, 2008 [Accessed Aug. 9, 2012], wikipedia.com, http://web.archive.org/web/20080416014043/http://en.wikipedia.org/wiki/Message_digest.*
Rinard et al., "Eliminating Synchronization Bottlenecks Using Adaptive Replication", ACM Digital Library, vol. 25, No. 3; May 2003, pp. 316-359.

(Continued)

*Primary Examiner* — Jason Liao
(74) *Attorney, Agent, or Firm* — Griffiths & Seaton PLLC

(57) ABSTRACT

Various embodiments for replicating deduplicated data using a processor device are provided. A block of the deduplicated data, created in a source repository, is assigned a global block identification (id) unique in a grid set inclusive of the source repository. The global block id is generated using at least one unique identification value of the block, a containing grid of the grid set, and the source repository. The global block id is transmitted from the source repository to a target repository. If the target repository determines the global block id is associated with an existing block of the deduplicated data located within the target repository, the block is not received by the target repository during a subsequent replication process.

44 Claims, 6 Drawing Sheets

OTHER PUBLICATIONS

Rinard et al., "Eliminating Synchronization Bottlenecks in Object-Based Programs Using Adaptive Replication", ACM Library, 1999, pp. 83-94.

Choi et al., "A General Framework for Prefetch Scheduling in Linked Data Structures and Its Application . . . " ACM Library, vol. 22, No. 2, May 2004, pp. 214-280.

Litwin et al., "LH—A Highly-Available Scalable Distributed Data Structure", ACM Library, vol. 30, No. 3, Sep. 2005, pp. 769-811.

Jesus Luna et al., "An Analysis of Security Services in Grid Storage Systems," CoreGRID Technical Report, No. TR-0090, Aug. 31, 2007, pp. 1-22.

* cited by examiner

REPLICATION OF DEDUPLICATED DATA

CROSS-REFERENCE TO RELATED APPLICATIONS

The present application is related to U.S. application Ser. No. 12/539,066, entitled "SYNCHRONIZATION OF REPLICATED SEQUENTIAL ACCESS STORAGE COMPONENTS," filed concurrently herewith and U.S. application Ser. No. 12/539,085, entitled "DEDUPLICATED DATA PROCESSING RATE CONTROL," filed concurrently herewith; both of which are incorporated herein by reference.

BACKGROUND OF THE INVENTION

1. Field of the Invention

The present invention relates in general to computers, and more particularly to apparatus, method and computer program product embodiments for replication of deduplicated data in a computing storage environment.

2. Description of the Related Art

Deduplication systems may externalize various logical data storage entities, such as files, data objects, backup images, data snapshots or virtual tape cartridges. It is often required that such data storage entities be replicated from their origin site to remote sites. Replicated data entities enhance fault tolerance abilities and availability of data. Such fault tolerance and wide availability is increasingly demanded. While several existing approaches may be used to perform data replication, and specifically, replication of deduplicated data entities, these approaches have accompanying limitations that negatively affect replication efficiency, system performance and data consistency, require additional overhead, or a combination of the above.

SUMMARY OF THE INVENTION

Data deduplication refers to the reduction and/or elimination of redundant data. In a data deduplication process, duplicate copies of data are reduced or eliminated, leaving a minimal amount of redundant copies, or a single copy of the data, respectively. Using deduplication processes provides a variety of benefits, such as reduction of required storage capacity and increased network bandwidth. Due to these and other benefits, deduplication has emerged in recent years as a highly important technological field in computing storage systems. Challenges to providing deduplication functionality include aspects such as efficiently finding duplicated data patterns in typically large storage repositories, and storing the data patterns in a deduplicated storage-efficient form.

In view of the current state of the art, a need exists for a mechanism for replication of deduplicated data that fulfills all requirements for an efficient replication process while avoiding limitations of existing methodologies, thus improving on existing approaches for replication of deduplicated data. Accordingly, various embodiments for replicating deduplicated data are provided. In one such embodiment, by way of example only, a method for replicated deduplicated data using a processor device is provided. A block of the deduplicated data, created in a source repository, is assigned a global block identification (id) unique in a grid set inclusive of the source repository. The global block id is generated using at least one unique identification value of the block, a containing grid of the grid set, and the source repository. The global block id is transmitted from the source repository to a target repository. If the target repository determines the global block id is associated with an existing block of the deduplicated data located within the target repository, the block is not received by the target repository during a subsequent replication process.

In addition to the foregoing exemplary method embodiment, other exemplary system and computer product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
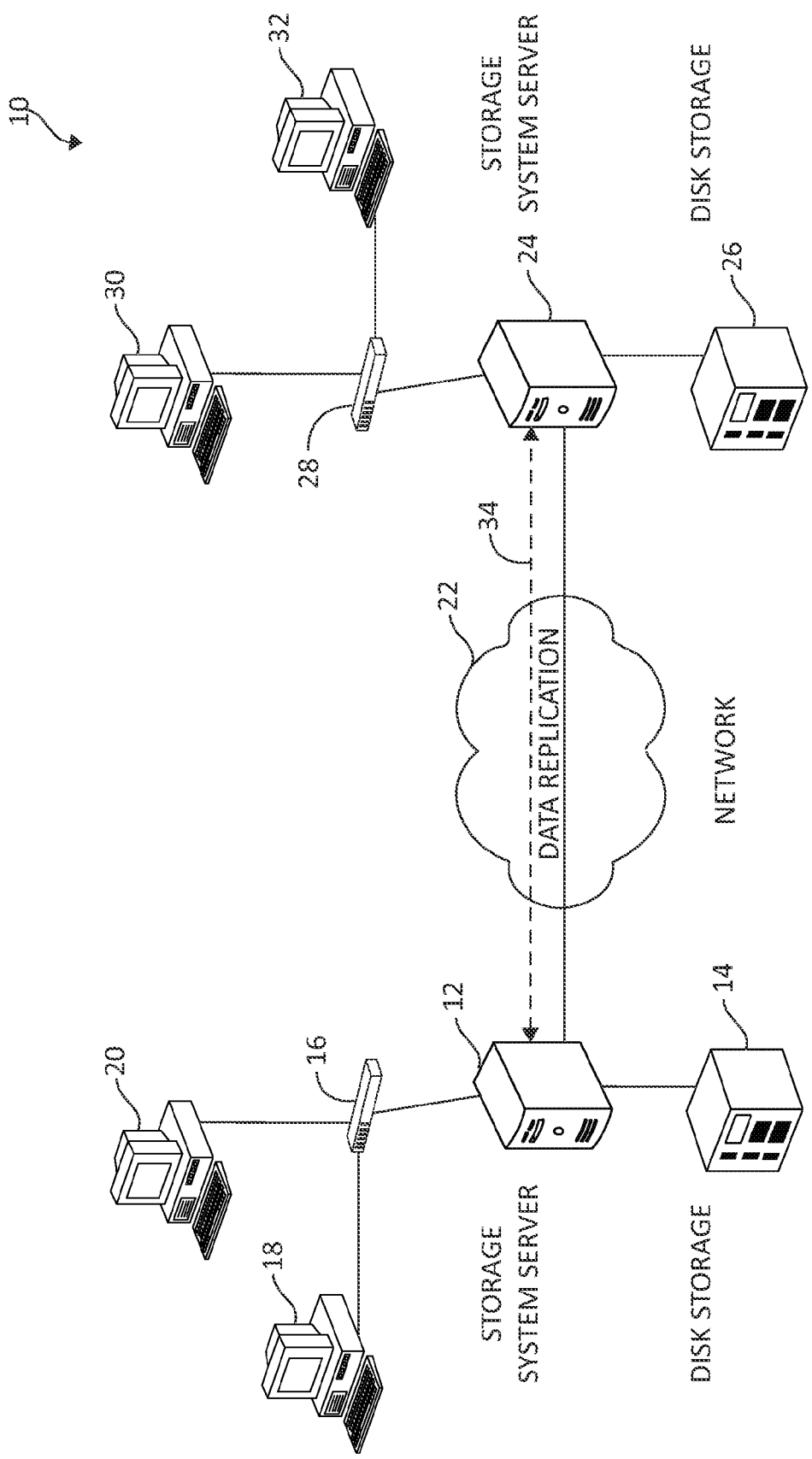
FIG. 1 illustrates an exemplary computing environment in which aspects of the present invention may be implemented.

Turning now to FIG. 1, exemplary architecture 10 of data storage systems (e.g., virtual tape systems) in a computing environment is depicted. Architecture 10 provides storage services to local hosts 18 and 20, and replicate data to remote data storage systems as shown. A local storage system server 12 in communication with a storage device 14 is connected to local hosts 18 and 20 over a network including components such as Fibre channel switch 16. Fibre channel switch 16 is capable, for example, of executing commands (such as small computer systems interface (SCSI) commands) for tape devices. The skilled artisan will appreciate that architecture 10 may include a variety of storage components. For example, storage devices 14 may include conventional hard disk drive (HDD) devices, or may include solid state drive (SSD) devices.

Local storage system server 12 is connected over network 22 to a remote storage system server 24. Remote server 24 communicates with a locally connected disk storage device 26, and with locally connected hosts 30 and 32 via another network and network component 28 such as Fibre channel switch 28. Network 22 may include a variety of network topologies, such as a wide area network (WAN), a local area network (LAN), a storage area network (SAN), and other configurations. Similarly, switches 16 and 28 may include other types of network devices.

Architecture 10, as previously described, provides local storage services to local hosts, and provides replicate data to the remote data storage systems (as denoted by data replication functionality using arrow 34). As will be described, various embodiments of the present invention and claimed subject matter may be implemented on architectures such as architecture 10. For example, in one embodiment, the disk storage device 14 may be part of a deduplicated storage system, storing deduplicated data entities. The deduplicated data entities may then undergo a data replication process 34 whereby the deduplicated data entities are replicated on the remote disk storage device 26. These processes will be further described in detail, following.

Such processes of replicating a data entity which resides in a deduplicated form within a deduplicated storage system, to a remote deduplication storage system, should be efficient in terms of processing time and storage requirements, both on the source and destination systems, and should possibly utilize the characteristics of the deduplication storage systems to facilitate such efficiencies.

An efficient replication process should address the following considerations: (1) the replicated data entity should be stored in a storage efficient deduplicated form within the target storage system, (2) the network bandwidth required for the replication process should be minimized, (3) the data of the replicated entity within the target storage system should be available for deduplication with data processed on the target system, (4) the replication process should ensure complete identity between the source and target copies of the replicated data entities (namely, the probability for a difference between the source and target copies of the replicated data entities should be zero), and (5) the source and target storage systems may be of different structure and layout.

There are several approaches for data replication, which may be used to design and implement replication mechanisms for deduplication storage systems. For deduplication systems that use mathematically strong digests (e.g., the Message Digest (MD) and Secure Hash Algorithm (SHA) hash function sets) to identify, store and retrieve data segments based on their contents, these digest values may be also used for a replication mechanism. Bandwidth reduction may be achieved by exchanging such digest values of the data to be replicated between the source and target systems, and furthermore the digest values of the replicated data may be used on the target side for deduplication processes. However, using such an approach would expose the replication process to a non-zero probability of inconsistency between the source and the replicated copies of the data, due to the reliance on the digest values rather than the actual data. Furthermore, there are deduplication systems that do not rely on mathematically strong digests, and for which implementing such an approach for replication may entail significant overhead in the storage and usage of such additional values.

Disk replication is generally based on propagating write operations from the source device to its target devices. Synchronous replication refers to a scenario where a write operation on the source device is considered complete only when all the target devices acknowledge the write operation. This approach guarantees complete consistency between the source and target devices. However, synchronous replication mechanisms typically reduce performance. Alternatively, asynchronous replication refers to a scenario where a write operation on the source device is considered complete as soon as the local operation is complete. Replication of the write operations is performed asynchronously in the background. This approach improves performance; with the caveat that the most recent write operations may be lost in case of failure of the source device. In the disk replication approach, since physical write operations are replicated, which are characterized by the physical locations of the blocks they affect on the source device, constraints are applied on the structure and layout of the target devices relative to the source device. In addition, since disk replication would be used below the software layers of a deduplication system, such a mechanism may not enable to process only the blocks which are specific to data entities (in their logically stable form) that should be replicated, thus possibly replicating additional non-relevant blocks, and therefore increasing system resources required for replication (both network bandwidth and storage). More efficient would be a mechanism integrated within the software layers of a deduplication system, which would be aware of the specific relevant blocks of data that should be replicated, given specific data entities for replication.

Replication of transactional data is generally based on the source system logging the updates and then replicating the logged data to the target systems. The target systems acknowledge reception of the replicated updates, thus allowing the replication of subsequent updates to proceed. There are also protocols enabling updates to be performed on a data entity via multiple storage systems, rather than one storage system. Methods in this class are generally used within database systems. However, in the context of deduplication storage systems, which may be non transactional, there may be no log of updates to replicate, therefore making this approach inapplicable. Furthermore, since such logs of updates may typically be associated with data entities larger or otherwise different than the data entities that should be replicated, additional non-relevant blocks may be replicated, thus increasing network bandwidth and storage resources required for replication.

The illustrated embodiments described, following, provide a novel approach for replication of deduplicated data, satisfying all of the above considerations for an efficient replication process while avoiding limitations of existing methodologies previously described, thus improving on existing approaches for replication of deduplicated data. In one example, the mechanisms of the illustrated embodiments may be directed to deduplication storage systems that partition the stored deduplicated data into variable sized blocks and achieve storage efficiency, given prior identification of recurring data patterns (via any appropriate method), by repeated referencing of the deduplicated data blocks that contain portions of such recurring data patterns.

Throughout the following description and claimed subject matter, the following terminology, pertaining to the illustrated embodiments, is described. A "repository" is intended to refer to a storage associated with a single or several processors, and whose data contents are stored in a deduplicated form. The repository may have aspects of virtualized storage. Alternatively, the repository may have aspects corresponding to physical storage, or may include aspects of both physical and virtual storage. A "grid" is intended to refer to a set of repositories whose data entities can be replicated to every other repository in the grid. A "grid set" is intended to refer to as the set of all grids where repositories may be migrated between grids in the grid set. A repository may be assigned at any given time to a single grid. Data may be streamed into a repository by way of replication from a remote source repository in the grid, or by any other supported way of receiving incoming data from local sources (e.g., a backup stream).

As will be seen throughout the following, the illustrated embodiments provide for assignment of each new block of deduplicated data created in a repository (namely, a block whose data was already determined to be new in the repository), with an identification value that is unique in the grid set. Such a unique block identification is generated by combining unique identification values of the block and the containing grid and repository, as will be described, following. This unique block identification has traits that facilitate efficient replication processes, such as the following. First, while the block identification uniquely identifies the block's data contents, it does not depend on the block's data contents in a probabilistic manner (such as digest functions). Therefore, the block identification eliminates any false matches during pruning of recurring data blocks based on these identification values, and provides complete safety with regard to data impairments. Second, the block identification is independent of the block's physical location in the repository, therefore avoiding any constraints on the structure and layout of the source and target repositories. Third, block identification values are never recycled. As a result, their generation and management are simple, and the possibility of stale block references is eliminated.

The unique block identification values are used for identification of data block recurrence in all the replication processes, thus enhancing the efficiency of these processes, as will be described, following. The values are transmitted from the source repository to the target repository. A target repository storing a block assigned with a unique identification value B will not receive a block with the same unique identification value B again during replication, but will rather reuse the same block already in storage.

In addition to the assignment and transmission of unique block identification values, the illustrated embodiments provide a mechanism whereby, with each block or set of blocks, an associated representation that enables data deduplication is also transmitted to the target repository and inserted into a deduplication index within the target repository. The data deduplication method used, and the associated data representation, may be of any type known to the skilled artisan. In one embodiment, the deduplication representation constitutes a portion of a deduplication index used in conjunction with the data deduplication method used. With each file that is replicated, for example, a matching part of the deduplication index is transferred (as the deduplication representation) to the target repository. The deduplication index may, in one embodiment, include mathematical calculations used to match new segments of file data to old segments of file data. In other examples, the deduplication index may include hash value indexes for blocks of associated file data.

Embedding the data deduplication representation within the target repository enables deduplication processes of incoming data streamed into the target repository, to find appropriate data within that repository for deduplication purposes. Namely, a block B' arriving into the target repository within an incoming data stream, and is similar or identical to another block B, which had previously arrived within a replicated data entity, will be considered for deduplication with block B and will be stored in the target repository as a reference to block B.

In view of the foregoing, the illustrated embodiments enable to achieve a highly efficient replication process, and address the earlier five aspects for efficient replication as follows. First, the replicated data entities are stored in a storage efficient deduplicated form within the target storage system, without any further processing required beyond transmission of the required data blocks, already in a deduplicated form. The deduplicated blocks may be stored in a further compressed or otherwise rearranged form (e.g. encrypted), and no extraction of decoding operations need be performed by the source or the target repositories during replication processes. The blocks are transmitted from the source to the target repository, and stored in the target repository in their same form that is preserved from the source repository.

Second, the network bandwidth required for the replication process of a data entity is minimized by transmitting only the deduplicated data blocks that are not already present in the target repository. Third, the data of a replicated entity within the target repository is available for deduplication with data processed on the target repository, by means of transmitting with the deduplicated data blocks also their deduplication enabling representation. Fourth, the replication method ensures complete identity between the source and target copies of the replicated data entities. Fifth and finally, the source and target repositories may be of different structure and layout.

Each new block of deduplicated data created in a repository is assigned with an identification value, which is unique in the grid set. In one embodiment, the unique block identification may be generated using the following method. First, a unique grid identification (referred to herein as "grid id") is computed. In one embodiment, this may be performed by incrementing the value of a grid id variable maintained by a software entity that corresponds to a grid set (denoted as a grid set manager) and facilitates generation of grids within that grid set. Alternatively, the user may assign a unique grid id.

A repository is created independently of the grids, and may subsequently be assigned to a grid, and further migrated between grids in the same grid set (at any given time a repository may be associated with a single grid). Upon assignment of a repository to a grid, the repository is assigned with a unique "repository id" computed by incrementing the value of a repository id variable maintained by a software entity, which corresponds to a grid (denoted as a grid manager) and facilitates affiliation of repositories to that grid. Alternatively, the user may assign a unique repository id. A unique "block id" is computed by incrementing the value of a block id variable maintained by a software entity that corresponds to a repository (denoted as a repository manager) and facilitates allocation of blocks within that repository.

Software entities as described above that correspond to a grid set, a grid, and a repository may be implemented as the skilled artisan will anticipate. For example, a particular software entity may be referred to as a "grid manager." The grid manager software may assist in managing the various ids described above. For example, the grid manager may perform a determination as to whether a particular grid id has been assigned, and assign the grid id to a new grid. Similarly, the grid manager or other software entity may manage and assign repository ids and block ids. The grid manager software may be implemented in conjunction with other storage management software, again as the skilled artisan would expect.

Figure 2:
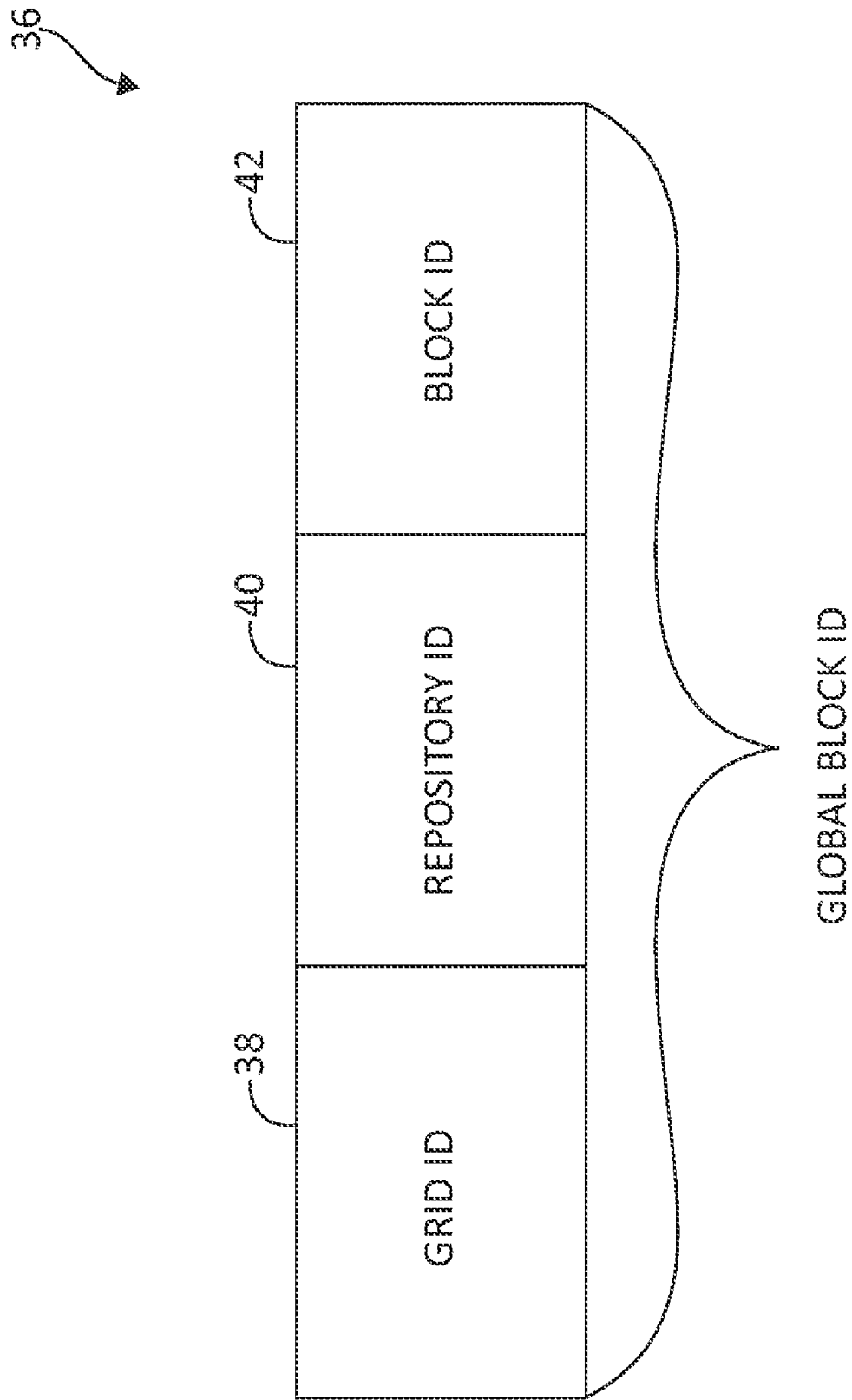
FIG. 2 illustrates an exemplary structure of a global block identification (ID)

A combination of the block id with the grid id and repository id, is defined as the "global block id" (denoted as GBID) of a given block, and serves as the unique identifying value of that block in the grid set. Turning now to FIG. 2, an exemplary data structure of a GBID 36 is illustrated. GBID 36 incorporates a combination of grid id 38 corresponding to a particular grid, repository id 40 corresponding to a particular repository, and block id 42 corresponding to a particular block.

When a new block of deduplicated data, originating from a locally processed incoming stream of data, is allocated, a new GBID is also allocated and assigned to that block. However, when a new block of deduplicated data is received during a replication process, its GBID received from the source repository is preserved and used also in the target repository. GBIDs may be recorded as follows. First, for a block received via a replication process, its GBID is recorded as received. For a block received via local data processing within a repository, its GBID is recorded in the repository such that its grid id and repository id components are set with null values. Note that within a repository, the block id component enables unique identification of a block. Upon transmission of such a block to a target repository, the appropriate values of the grid id and repository id components are added to the block id component to form the full GBID value. This enables easier migration of repositories between grids, since no persistent block level data should be modified when a repository is migrated.

The values of the GBID components are never recycled. Therefore, each component is defined to be large enough to accommodate for continuous processing of at least a defined time frame. The metadata of the relevant grid set and grid is maintained within each associated repository, so that communications may be handled by each repository independently of the software entities and metadata of the grid set and grid.

In one embodiment, the software entities may store an identification file having information relating to each grid over which the software entity is responsible. The information may include equivalent information relating to certain repositories within the grid, and certain blocks within the repositories. The information may include the aforementioned grid ids, repository ids, and block ids. Further, the information may include internet protocol (IP) addresses associated with particular grids, or members of a particular grid. For redundancy purposes, the identification file may be stored in multiple locations.

Figure 3:
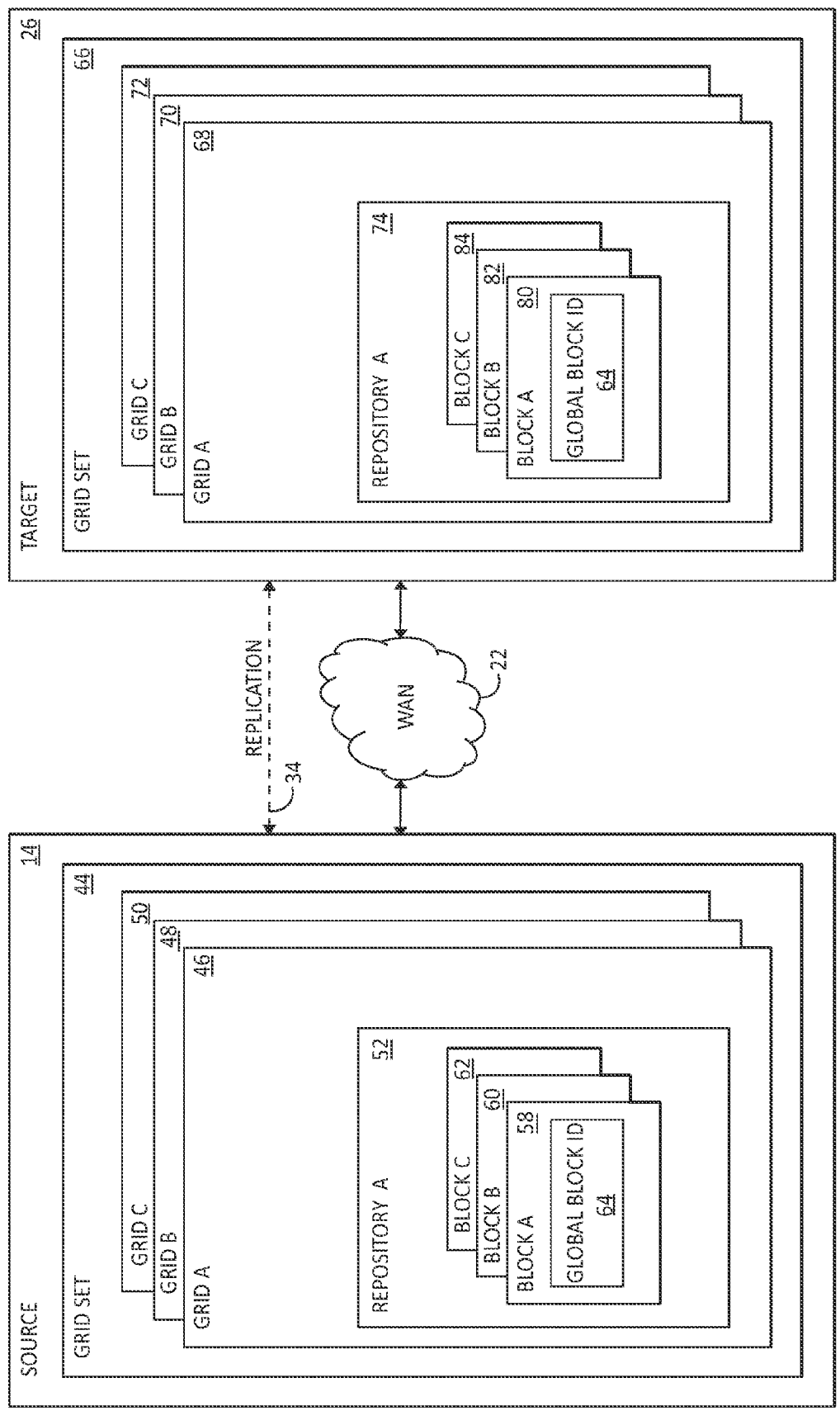
FIG. 3 illustrates exemplary structures for providing replication of deduplicated data between source and target repositories.

FIG. 3, following, illustrates the various structures previously described as incorporated into a deduplicated storage system including the storage devices 14 and 26 previously illustrated in FIG. 1. Storage device 14 is enabled as a source device 14, while remote device 26 is enabled as a target device 26. Source device 14 includes grid set 44. Three grids A, B, and C are shown (grids 46, 48, and 50). Repository A (repository 52) is inclusive of grid 46 as shown. Other repositories (such as a repository B and/or repository C) may be inclusive of grid 46, inclusive of grid 48, inclusive of grid set 44, or may be located and/or associated with another source 14, or elsewhere as the skilled artisan will anticipate. Blocks A-C (blocks 58, 60, and 62) are inclusive of repository 52 as shown. Finally, GBID 64 is associated with block 58.

Through the replication process 34, the GBID 64 is transmitted over network 22 to target device 26. Target device 26 includes various structures similar, and corresponding to, those previously described for source device 14, including grid set 66, grids 68, 70, and 72, repository 74, blocks 80, 82, and 84, and GBID 64. The skilled artisan will appreciate that while several grids, repositories, blocks, etc., are illustrated, a particular source and target device may include multitudes of these structures, and again, these structures may be located elsewhere. Furthermore, while GBID 64 is illustrated as inclusive of blocks 58 and 80, such illustration is for purposes of convenience to show that GBID 64 is associated with those blocks. Accordingly, the skilled artisan will appreciate that the GBID 64 may be logically or physically located in additional locations within the deduplicated storage system, or elsewhere.

Figure 4:
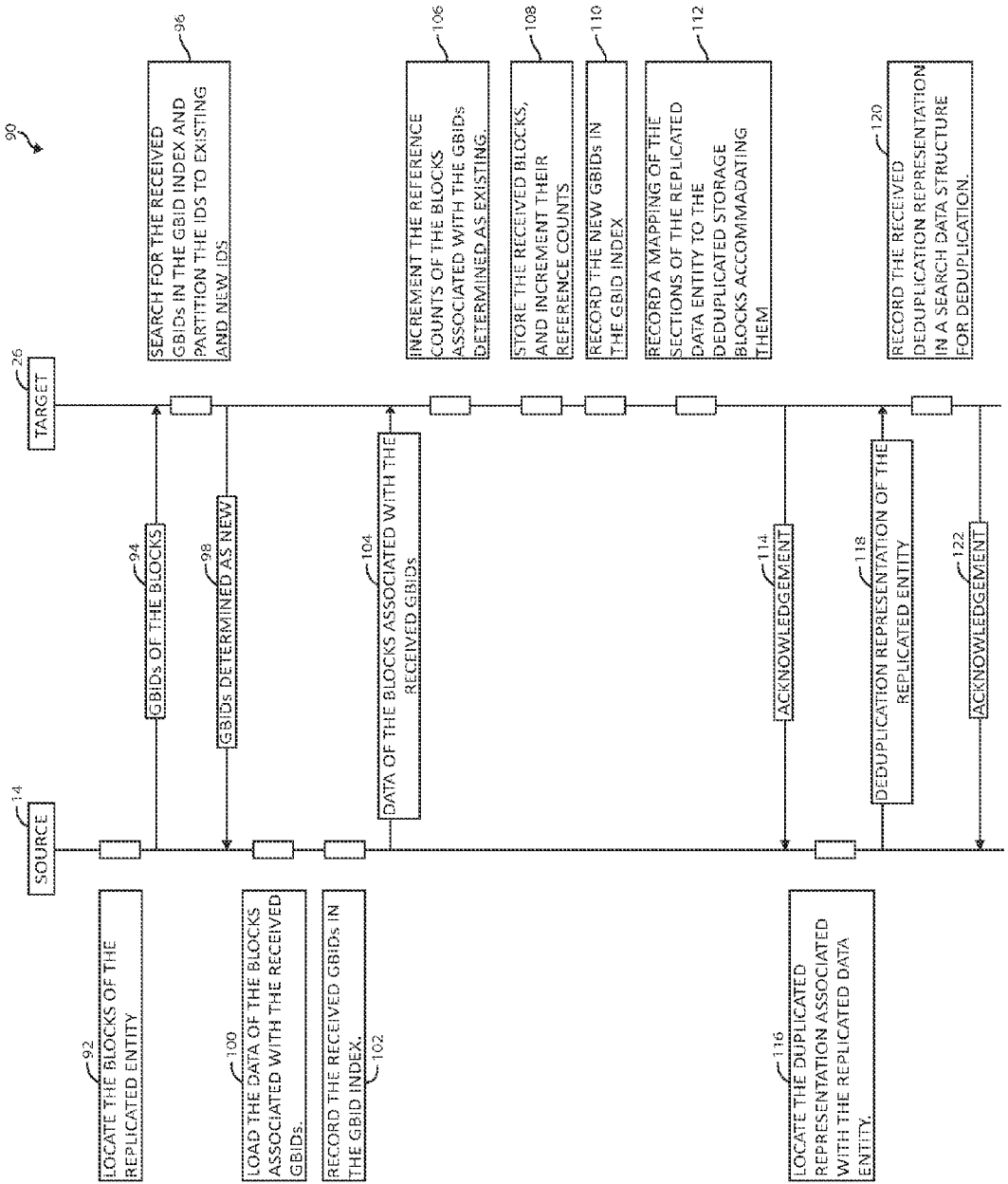
FIG. 4 illustrates an exemplary method for replication of deduplicated data between source and target repositories.
Figure 5:
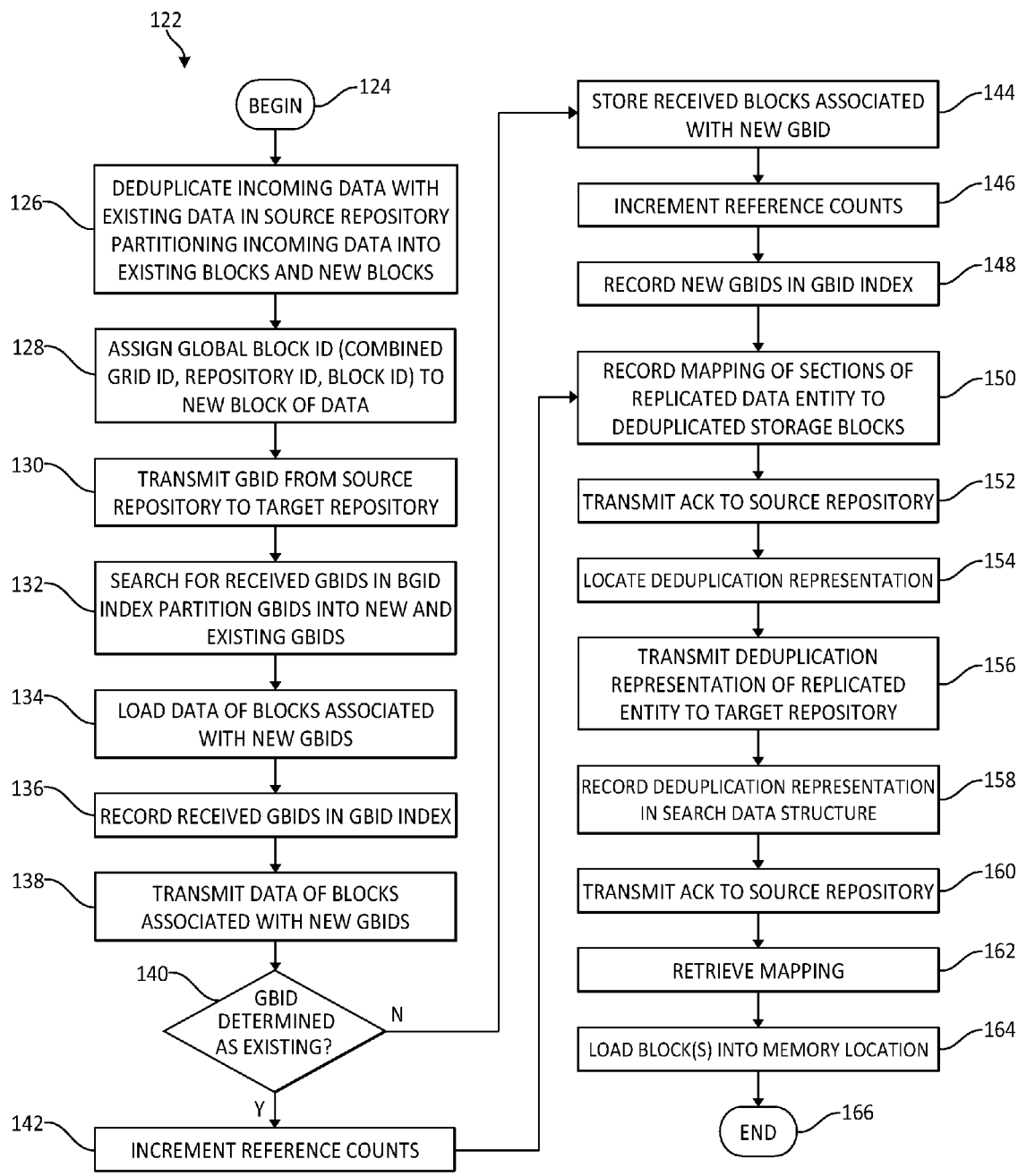
FIG. 5 illustrates an additional exemplary method for replication of deduplicated data between source and target repositories including processing of deduplicated data.

The global block ids are used for identification of block recurrence in the replication processes, consequently saving bandwidth required for replication and storing the data in a deduplicated form (preserved from the source repository without further processing). Turning now to FIGS. 4 and 5, exemplary methods 90 and 122 are provided for deduplication processing and replication between source and target repositories. As one skilled in the art will appreciate, various steps in the methods 90 and 122 may be implemented in differing ways to suit a particular application. In addition, the described method may be implemented by various means, such as hardware, software, firmware, or a combination thereof operational on or otherwise associated with the computing storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), solid state devices such as solid state drives (SSDs) and other types of storage mediums.

Turning first to FIG. 4, a block diagram of exemplary replication between a source device 14 (containing one or more source repositories) and a target device 26 (containing one or more target repositories) (See also, e.g., FIG. 1) is presented. Method 90 begins with step 92, as the deduplicated storage blocks that store the data of the replicated entity in the source repository are located. As a next step, the GBID values of these blocks are transmitted to the target repository (step 94). The target repository receives these GBID values and searches locally for existence of these ids using a GBID index. The target repository subsequently partitions the GBID values into those previously located in the target repository (existing), and those not previously located in the target repository (previously non-existing) (step 96).

GBID values designated as previously non-existing on the target repository are transmitted back to the source repository (step 98). The source repository loads the data of the blocks associated with the previously non-existing GBID values (step 100). The source repository then records the GBID values of the blocks transmitted to the target repository within its GBID index (step 102). The source repository transmits the data of the blocks associated with the previously non-existing ids, in the form in which they are stored (e.g. compressed), to the target repository.

Once the data is received by the target repository, the target repository increments the reference counts of the existing blocks (step 106), stores the received (non-existing) blocks in their received form (preserved from the source repository) and increments their reference count accordingly (step 108). As a next step, the target repository records the GBID values of the received blocks within its GBID index (step 110). A mapping of the sections of the replicated data to the deduplicated storage blocks accommodating these sections is then recorded in the target repository (step 112).

Once the mapping is recorded, the target repository transmits an acknowledgement that the data has been received and that such activity has been performed to the source repository (step 114). Upon receiving the acknowledgement, the source repository locates the deduplication representation (of any type, as previously described) associated with the replicated data entity (step 116), and transmits the deduplication representation of the replicated data entity to the target repository (step 118). The target repository receives the deduplication representation and records it locally within a search data structure for deduplication (step 120). Method 90 concludes by the target repository sending an additional acknowledgement that the representation was received and recorded to the source repository (step 122).

While FIG. 4 describes, in block diagram format, an exemplary process of replication, additional processes relating the receipt of incoming data by the source repository may occur prior to such replication. This is due to the fact that new data is continually streamed to the deduplicated storage system as the computing storage environment operates. Additionally, processes relating to the reading of replicated data by the target repository may occur subsequent to such replication. FIG. 5, following, provides an exemplary illustration to these processes, in addition to the replication process previously described, in flow chart diagram form.

Method 122 begins (step 124), with the incoming data deduplicated with the existing data in the repository based on deduplication representation of the data stored in the repository (using any appropriate method). Eventually, the deduplicated data is partitioned into blocks that already exist in the repository and new blocks that do not exit in the repository (step 126). Note that whichever deduplication representation is used may be associated either with incoming data processed locally within a repository, or with data that is replicated to that repository from other repositories, as will be elaborated in the following. The deduplication representation of the incoming data is also added to the repository, to be used for deduplication of further incoming data.

For blocks that exist in the repository, their reference count is incremented. For new blocks, a new global block id (GBID) is generated (for each new block), and the new blocks accompanied with their GBID (where the grid id and repository id components are set to null values within the GBIDs) are stored within the repository (step 128). A mapping of the sections of the incoming data to the deduplicated storage blocks accommodating these sections is recorded in the repository. This mapping enables reconstruction of the incoming data stream after it is stored using deduplicated blocks, for reading purposes.

Once incoming data is processed as previously described, the deduplicated data may be replicated. The deduplicated storage blocks that store the data of the replicated entity in the source repository are located, and the GBID values of these blocks are transmitted to the target repository (step 130). The target repository receives these GBID value and searches locally for existence of these ids using a GBID index, subsequently partitioning these ids to existing and non-existing ids (step 132), and transmitting the non-existing ids back to the source repository. The source repository loads the data of the blocks associated with the new, non-existing ids (step 134), records the received, non-existing GBIDs within its GBID index (step 136), and transmits the data of the blocks associated with the non-existing GBIDs, in the form in which they are stored (e.g. compressed), to the target repository (step 138).

If the GBIDs associated with the transmitted data were previously determined as existing (step 140), the target repository increments the reference counts of the associated existing blocks (step 142) before proceeding to step 150. If the GBIDs associated with the transmitted data were previously determined as new (again, step 140), the target repository stores the received (non-existing) blocks in their received form (preserved from the source repository) (step 144) and increments their reference count accordingly (step 146). The target repository records the new GBID values of the received blocks within its GBID index (step 148). As a following step, a mapping of the sections of the replicated data to the deduplicated storage blocks accommodating these sections is recorded in the target repository (step 150).

Following transmission of the acknowledgement (step 152), the source repository locates (step 154) and transmits the deduplication representation (again, of any type) associated with the replicated data entity (step 156). The target repository receives the deduplication representation and records it locally within a search data structure for deduplication (step 158) before transmitting the second acknowledgement to the source repository (step 160). Since data replicated from the source repository to the target repository is available for deduplication with the data locally processes within the target repository, locally processed data entities may be stored in the target repository, also using deduplicated blocks that were originally received via replication from the source repository. When replicating such data entities from the target repository to the source repository, the deduplicated blocks accommodating parts of these entities, which were received originally from the source repository, are not transmitted back to the source repository since their GBID values were recorded in the GBID index of the source repository upon transmission to the target repository.

As previously indicated, at a point subsequent to the replication processes, the data of a replicated entity with the target repository may be read. When this occurs, the aforementioned mapping of the replicated entity to deduplicated storage blocks is retrieved by the target repository (step 162). Based on the above mapping, the appropriate storage blocks are loaded into memory and the appropriate data segments from these blocks are retrieved (step 164). The method 122 then ends (step 166).

In some embodiments, a new (non-existing) block may be received via a replication process from other repositories or in frame of locally processed incoming data. Although the generation of a GBID for a new block is different between these cases (as specified before), the data of a new block is stored in the same manner for both cases. Generally, a logical storage segment is allocated to accommodate a group of new blocks, and the new block is stored within the allocated storage segment. This logical storage segment may be physically located anywhere in the repository, depending on the repository's internal logic and optimizations. Accordingly, the mechanisms of the illustrated embodiments therefore do not apply any constraints on the structure and layout of the target repositories relative to the source repository.

Figure 6:
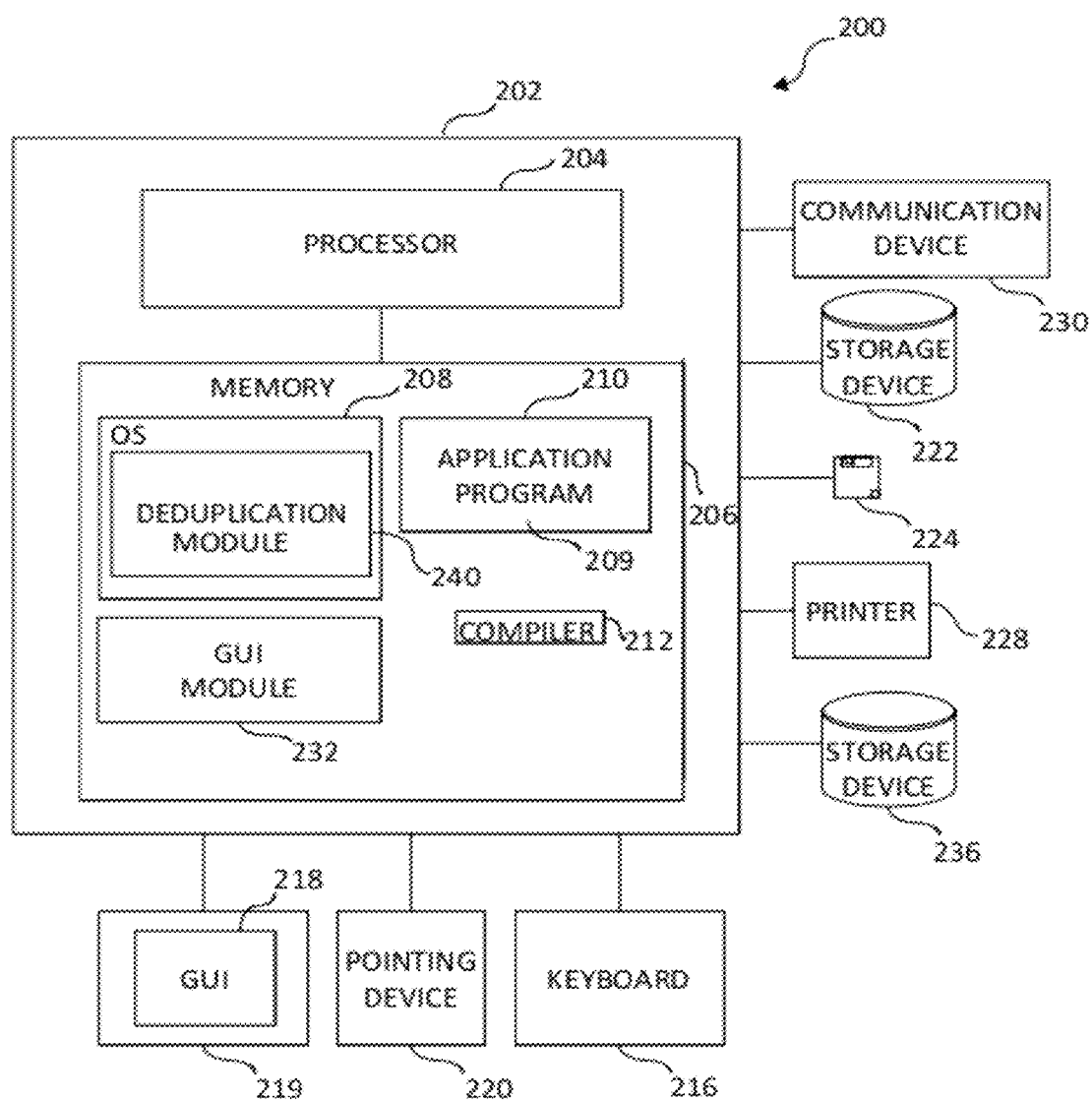
FIG. 6 illustrates an exemplary computing device including a processor device in a computing environment such as the computing environment shown in FIG. 1.

FIG. 6 hereafter provides an example of a portion of the computer environment 10 depicted in FIG. 1 in which the mechanisms of the foregoing embodiments may be implemented. It should be appreciated, however, that FIG. 6 is only exemplary and is not intended to state or imply any limitation as to the particular architectures in which the exemplary aspects of the various embodiments may be implemented. Many modifications to the architecture depicted in FIG. 6 may be made without departing from the scope and spirit of the following description and claimed subject matter.

FIG. 6 illustrates a portion 200 of an exemplary computer environment that can be used to implement embodiments of the present invention. A computer 202 comprises a processor 204 and a memory 206, such as random access memory (RAM). In one embodiment, storage system server 12 (FIG. 1) may include components similar to those shown in computer 202. The computer 202 is operatively coupled to a display 219, which presents images such as windows to the user on a graphical user interface 218. The computer 202 may be coupled to other devices, such as a keyboard 216, a mouse device 220, a printer 228, etc. Of course, those skilled in the art will recognize that any combination of the above components, or any number of different components, peripherals, and other devices, may be used with the computer 202.

Generally, the computer 202 operates under control of an operating system (OS) 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. In one embodiment of the present invention, the OS 208 facilitates the backup mechanisms. Although the GUI module 232 is depicted as a separate module, the instructions performing the GUI functions can be resident or distributed in the operating system 208, the application program 210, or implemented with special purpose memory and processors. OS 208 includes a replication module 240 which may be adapted for carrying out various processes and mechanisms in the exemplary embodiments previously described. Replication module 240 may be implemented in hardware, firmware, or a combination of hardware and firmware. In one embodiment, the replication module 240 may be embodied as an application specific integrated circuit (ASIC). As the skilled artisan will appreciate, functionality associated with the replication module 240 may also be embodied, along with the functionality associated with the processor 204, memory 206, and other components of computer 202, in a specialized ASIC known as a system on chip (SoC). Further, the functionality associated with the replication module (or again, other components of the computer 202) may be implemented as a field programmable gate array (FPGA).

As depicted in FIG. 6, the computer 202 includes a compiler 212 that allows an application program 210 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic that was generated using the compiler 212. The computer 202 also optionally comprises an external data communication device 230 such as a modem, satellite link, Ethernet card, wireless link or other device for communicating with other computers, e.g. via the Internet or other network.

Data storage device 222 is a direct access storage device (DASD) 222, including one or more primary volumes holding a number of datasets. DASD 222 may include a number of storage media, such as hard disk drives (HDDs), tapes, and the like. Data storage device 236 may also include a number of storage media in similar fashion to device 222. The device 236 may be designated as a backup device 236 for holding backup versions of the number of datasets primarily stored on the device 222. As the skilled artisan will appreciate, devices 222 and 236 need not be located on the same machine. Devices 222 may be located in geographically different regions, and connected by a network link such as Ethernet. Devices 222 and 236 may include one or more volumes, with a corresponding volume table of contents (VTOC) for each volume.

In one embodiment, instructions implementing the operating system 208, the computer program 210, and the compiler 212 are tangibly embodied in a computer-readable medium, e.g., data storage device 220, which may include one or more fixed or removable data storage devices 224, such as a zip drive, floppy disk, hard drive, DVD/CD-ROM, digital tape, flash memory card, solid state drive, etc., which are generically represented as the storage device 224. Further, the operating system 208 and the computer program 210 comprise instructions which, when read and executed by the computer 202, cause the computer 202 to perform the steps necessary to implement and/or use the present invention. For example, the computer program 210 may comprise instructions for implementing the grid set manager, grid manager and repository manager previously described. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention may include one or more associated software application programs 210 that include, for example, functions for managing a distributed computer system comprising a network of computing devices, such as a storage area network (SAN). Accordingly, processor 204 may comprise a storage management processor (SMP). The program 210 may operate within a single computer 202 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art. (Note that a fibre channel SAN is typically used only for computers to communicate with storage systems, and not with each other.)

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for replicating deduplicated data using a processor device, comprising:
creating a plurality of blocks of the deduplicated data in a source repository;
assigning each block of the deduplicated data a global block identification (ID) to generate a plurality of global block IDs, each global block ID identifies data contents in its respective block, is not dependent on the data contents in a probabilistic manner, and is unique without ever being recycled;
transmitting the plurality of global block IDs from the source repository to a target repository;
determining if each global block ID is associated with an existing block of the deduplicated data located within the target repository;
partitioning the plurality of global block IDs into a first portion of global block IDs previously existing within the target repository and a second portion of global block IDs previously non-existing within the target repository based on the determination;
transmitting, by the target repository, the first portion of global block IDs back to the source repository; and
transmitting, by the source repository, data from each block associated with the first portion of global block IDs to the target repository in response to receipt of the first portion of the global block IDs.

2. The method of claim 1, further including, subsequent to transmitting the first portion of global block IDs back to the source repository, transmitting, for each block, a representation enabling data deduplication from the source repository to the target repository, wherein the representation is inserted into a deduplication index within the target repository.

3. The method of claim 1, wherein the assigning each global ID further includes performing at least one of:
assigning a grid ID, unique in the containing grid of the grid set, wherein the grid ID is computed by performing one of selecting a previously nonexistent grid ID and manually assigning the grid ID,
upon assignment of the source repository to the containing grid of the grid set, assigning the source repository a repository ID, unique in the containing grid, wherein the repository ID is computed by performing one of selecting a previously nonexistent repository ID and manually assigning the repository ID, and
assigning a block ID, unique the containing grid of the grid set, wherein the block ID is computed by selecting a previously nonexistent block ID.

4. The method of claim 3, wherein at least one of:
the selecting the previously nonexistent grid ID includes incrementing a grid ID variable corresponding to the grid set,
the selecting the previously nonexistent repository ID includes incrementing a repository ID variable corresponding to the containing grid, and
the selecting the previously nonexistent block ID includes incrementing a block ID variable corresponding to the source repository.

5. The method of claim 4, further including generating each global block ID by combining the grid ID, the repository ID, and the block ID corresponding to each respective block.

6. The method of claim 1, further including:
receiving incoming data within the source repository; and
deduplicating the incoming data with existing data in the source repository, partitioning the incoming data into a plurality of existing blocks and a plurality of new blocks of the deduplicated data, wherein the block is one of the plurality of the new blocks, each of the plurality of existing blocks having a reference count incremented to reflect the receipt of the incoming data,
in addition to the assigning the block the global block ID, assigning a plurality of additional global block IDs to each of a remaining plurality of new blocks, wherein each of the block, the global block ID, the plurality of the new blocks, and the plurality of the additional global block IDs are stored within the source repository, and recording a mapping of sections of the incoming data to the plurality of the existing blocks and the plurality of the new blocks in the source repository.

7. The method of claim 1, further including, pursuant to the transmitting the plurality of global block IDs, recording, by the source repository, the each unique identification value within a global block ID index.

8. The method of claim 1, further including by the target repository, pursuant to the transmitting the plurality of global block IDs, searching for an existence of each global block ID using the deduplication index, wherein if a particular global block ID is determined to be nonexistent within the target repository:
   transmitting the particular global block ID from the target repository to the source repository, and
   transmitting data associated with the particular block from the source repository to the target repository.

9. The method of claim 8, further including by the target repository, subsequent to the transmitting the data associated with the particular block, storing the data associated with the particular block within the target repository, and incrementing a reference count associated with the particular block.

10. The method of claim 8, further including, if the particular global block ID is determined to be existent within the target repository, incrementing a reference count associated with the particular block.

11. The method of claim 8, further including by the target repository, subsequent to the transmitting the particular global block ID, performing at least one of:
   recording the particular global block ID within a global block ID index, and
   recording a mapping of sections of replicated data to the particular block and a plurality of additional blocks of the deduplicated data.

12. The method of claim 11, wherein the target repository records the mapping of the sections, the target repository further performing at least one of:
   retrieving the mapping, and
   loading at least one of the particular block and the plurality of the additional blocks into a memory location.

13. A system for replicating deduplicated data, comprising:
   at least one processor device operable in a computing storage environment, the at least one processor device in communication with a source repository and a target repository, wherein the at least one processor device is adapted for:
      creating a plurality of blocks of the deduplicated data in a source repository;
      assigning each block of the deduplicated data a global block identification (ID) to generate a plurality of global block IDs, each global block ID identifies data contents in its respective block, is not dependent on the data contents in a probabilistic manner, and is unique without ever being recycled,
      transmitting the plurality of global block IDs from the source repository to the target repository,
      determining if each global block ID is associated with an existing block of the deduplicated data located within the target repository,
      partitioning the plurality of global block IDs into a first portion of global block IDs previously existing within the target repository and a second portion of global block IDs previously non-existing within the target repository based on the determination,
      transmitting the first portion of global block IDs back to the source repository, and
      transmitting data from each block associated with the first portion of global block IDs to the target repository in response to receipt of the first portion of the global block IDs.

14. The system of claim 13, wherein the at least one processor device is further adapted for, subsequent to the transmitting each global block ID, transmitting, for each block, a representation enabling data deduplication from the source repository to the target repository, wherein the representation is inserted into a deduplication index within the target repository.

15. The system of claim 13, wherein the at least one processor device is further adapted for, pursuant to the assigning each global ID, performing at least one of:
   assigning a grid ID, unique in the containing grid of the grid set, wherein the grid ID is computed by performing one of selecting a previously nonexistent grid ID and manually assigning the grid ID,
   upon assignment of the source repository to the containing grid, assigning the source repository a repository ID, unique in the containing grid of the grid set, wherein the repository ID is computed by performing one of selecting a previously nonexistent repository ID and manually assigning the repository ID, and
   assigning a block ID, unique in the containing grid of the grid set, wherein the block ID is computed by selecting a previously nonexistent block ID.

16. The system of claim 15, wherein at least one of:
   the selecting the previously nonexistent grid ID includes incrementing a grid ID variable corresponding to the grid set,
   the selecting the previously nonexistent repository ID includes incrementing a repository ID variable corresponding to the containing grid, and
   the selecting the previously nonexistent block ID includes incrementing a block ID variable corresponding to the source repository.

17. The system of claim 16, wherein the at least one processor device is further adapted for generating each global block ID by combining the grid ID, the repository ID, and the block ID corresponding to each respective block.

18. The system of claim 14, wherein the at least one processor device is further adapted for, upon receipt of incoming data within the source repository:
   deduplicating the incoming data with existing data in the source repository, partitioning the incoming data into a plurality of existing blocks and a plurality of new blocks of the deduplicated data, wherein the block is one of the plurality of the new blocks, each of the plurality of existing blocks having a reference count incremented to reflect the receipt of the incoming data,
   in addition to the assigning the block the global block ID, assigning a plurality of additional global block ID s to each of a remaining plurality of new blocks, wherein each of the block, the global block ID, the plurality of the new blocks, and the plurality of the additional global block ID s are stored within the source repository, and
   recording a mapping of sections of the incoming data to the plurality of the existing blocks and the plurality of the new blocks in the source repository.

19. The system of claim 14, wherein the source repository and the at least one processor device are further adapted for, pursuant to the transmitting of the first portion of the global block IDs, recording each unique identification value within a global block ID index.

20. The system of claim 14, wherein the target repository and the at least one processor device are further adapted for, pursuant to the transmitting the first portion of the global block IDs, searching for an existence of each global block ID using the deduplication index, wherein if a particular global block ID is determined to be nonexistent within the target repository:
  transmitting the particular global block ID from the target repository to the source repository, and
  transmitting data associated with the particular block from the source repository to the target repository.

21. The system of claim 20, wherein the target repository and the at least one processor device are further adapted for, subsequent to the transmitting the data associated with the particular block, storing the data associated with the particular block within the target repository, and incrementing a reference count associated with the particular block.

22. The system of claim 20, wherein the target repository and the at least one processor device are further adapted for, if the particular global block ID is determined to be existent within the target repository, incrementing a reference count associated with the particular block.

23. The system of claim 20, wherein the target repository and the at least one processor device are further adapted for, subsequent to the transmitting the particular global block ID, performing at least one of:
  recording the particular global block ID within a global block ID index, and
  recording a mapping of sections of replicated data to the particular block and a plurality of additional blocks of the deduplicated data.

24. The system of claim 23, wherein the target repository records the mapping of the sections and wherein the target repository and the at least one processor device are further adapted for, performing at least one of:
  retrieving the mapping, and
  loading at least one of the particular block and the plurality of the additional blocks into a memory location.

25. A computer program product for replicating deduplicated data using a processor device, the computer program product comprising a non-transitory computer-readable storage medium having computer-readable program code portions stored therein, the computer-readable program code portions comprising:
  a first executable portion for creating a plurality of blocks of the deduplicated data in a source repository;
  a second executable portion for assigning each block of the deduplicated data a global block identification (ID) to generate a plurality of global block IDs, each global block ID identifies data contents in its respective block, is not dependent on the data contents in a probabilistic manner, and is unique without ever being recycled;
  a third executable portion for transmitting the plurality of global block IDs from the source repository to a target repository;
  a fourth executable portion for determining if each global block ID is associated with an existing block of the deduplicated data located within the target repository;
  a fifth executable portion for partitioning the plurality of global block IDs into a first portion of global block IDs previously existing within the target repository and a second portion of global block IDs previously non-existing within the target repository based on the determination;
  a sixth executable portion for transmitting, by the target repository, the first portion of global block IDs back to the source repository; and
  a seventh executable portion for transmitting, by the source repository, data from each block associated with the first portion of global block IDs to the target repository in response to receipt of the first portion of the global block IDs.

26. The computer program product of claim 25, further including an eighth executable portion for, subsequent to the transmitting the first portion of the global block IDs, transmitting, for each block, a representation enabling data deduplication from the source repository to the target repository, wherein the representation is inserted into a deduplication index within the target repository.

27. The computer program product of claim 25, further including an eighth executable portion for, pursuant to the assigning each global ID, performing at least one of:
  assigning a grid ID, unique in the containing grid of the grid set, wherein the grid ID is computed by performing one of selecting a previously nonexistent grid ID and manually assigning the grid ID,
  upon assignment of the source repository to the containing grid, assigning the source repository a repository ID, unique in the containing grid, wherein the repository ID is computed by performing one of selecting a previously nonexistent repository ID and manually assigning the repository ID, and
  assigning a block ID, unique in the source repository, wherein the block is computed by selecting a previously nonexistent block ID.

28. The computer program product of claim 27, wherein at least one of:
  the selecting the previously nonexistent grid ID includes incrementing a grid ID variable corresponding to the grid set,
  the selecting the previously nonexistent repository ID includes incrementing a repository ID variable corresponding to the containing grid, and
  the selecting the previously nonexistent block ID includes incrementing a block ID variable corresponding to the source repository.

29. The computer program product of claim 28 further including a ninth executable portion for generating each global block ID by combining the grid ID, the repository ID, and the block ID corresponding to each respective block.

30. The computer program product of claim 26, further including an eighth executable portion for, upon receipt of incoming data within the source repository:
  deduplicating the incoming data with existing data in the source repository, partitioning the incoming data into a plurality of existing blocks and a plurality of new blocks of the deduplicated data, wherein the block is one of the plurality of the new blocks, each of the plurality of existing blocks having a reference count incremented to reflect the receipt of the incoming data,
  in addition to the assigning the block the global block ID, assigning a plurality of additional global block IDs to each of a remaining plurality of new blocks, wherein each of the block, the global block ID, the plurality of the new blocks, and the plurality of the additional global block IDs are stored within the source repository, and
  recording a mapping of sections of the incoming data to the plurality of the existing blocks and the plurality of the new blocks in the source repository.

31. The computer program product of claim 26, further including an eighth executable portion for, pursuant to the transmitting the first portion of the global block IDs, recording, by the source repository, the at least one unique identification value within a global block ID index.

32. The computer program product of claim 26, further including an eighth executable portion for, by the target repository, pursuant to the transmitting the first portion of the global block IDs, searching for an existence of a particular global block ID using the deduplication index, wherein if the particular global block ID is determined to be nonexistent within the target repository:

transmitting the particular global block ID from the target repository to the source repository, and
   transmitting data associated with the particular block from the source repository to the target repository.

33. The computer program product of claim 32, further including a ninth executable portion for, by the target repository, subsequent to the transmitting the data associated with the particular block, storing the data associated with the particular block within the target repository, and incrementing a reference count associated with the particular block.

34. The computer program product of claim 32, further including a ninth executable portion for, if the particular global block ID is determined to be existent within the target repository, incrementing a reference count associated with the particular block.

35. The computer program product of claim 32, further including a ninth executable portion for, by the target repository, subsequent to the transmitting the first portion of the global block IDs, performing at least one of:

recording each global block ID within a global block ID index, and
   recording a mapping of sections of replicated data to the particular block and a plurality of additional blocks of the deduplicated data.

36. The computer program product of claim 35, wherein the target repository records the mapping of the sections, the computer program product further including a tenth executable portion for, by the target repository, performing at least one of:

retrieving the mapping, and
   loading at least one of the particular block and the plurality of the additional blocks into a memory location.

37. A device, comprising:
   a circuit customized for performing steps of a method for replicating deduplicated data, the steps including:
      creating a plurality of blocks of the deduplicated data in a source repository,
      assigning each block of the deduplicated data a global block identification (ID) to generate a plurality of global block IDs, each global block ID identifies data contents in its respective block, is not dependent on the data contents in a probabilistic manner, and is unique without ever being recycled,
      transmitting the plurality of global block IDs from the source repository to a target repository,
      determining if each global block ID is associated with an existing block of the deduplicated data located within the target repository,
   partitioning the plurality of global block IDs into a first portion of global block IDs previously existing within the target repository and a second portion of global block IDs previously non-existing within the target repository based on the determination,
      transmitting the first portion of the global block IDs back to the source repository, and
      transmitting data from each block associated with the first portion of global block IDs to the target repository in response to receipt of the first portion of the global block IDs.

38. The device of claim 37, wherein the steps further include, subsequent to the transmitting the first portion of the global block IDs, transmitting, for each block, a representation enabling data deduplication from the source repository to the target repository, further wherein the representation is inserted into a deduplication index within the target repository.

39. The device of claim 37, wherein the circuit includes one of an application-specific integrated circuit (ASIC), system-on-chip (SoC), and a field programmable gate array (FPGA).

40. A method for replicating deduplicated data using a processor device, comprising:
   performing each of:
      assigning a grid identification (ID) to each of a plurality of grids comprising a grid set, the grid ID unique to each grid within the grid set, wherein the grid ID is computed by performing one of selecting a previously nonexistent grid ID and manually assigning the grid ID,
      upon assignment of a source repository to each grid in the grid set, assigning each source repository a repository ID, the repository ID unique in the grid set, wherein the repository ID is computed by performing one of selecting a previously nonexistent repository ID and manually assigning the repository ID, and
      assigning a block ID to each block of data, the block ID unique in the grid set, wherein:
         each block ID identifies data contents in its respective block and is not dependent on the data contents in a probabilistic manner,
         the grid ID, the repository ID, and the block ID form a global block ID, and
         each global block ID is never recycled; and
      storing each of the grid ID, the repository ID, and the block ID as metadata in an identification file.

41. The method of claim 40, further including storing at least one internet protocol (IP) address associated with at least one of the grid and the source repository as the metadata along with the grid ID, the repository ID, and the block ID in the identification file.

42. The method of claim 41, further including generating a global block identification (ID), unique in the source repository and a target repository, by combining the grid ID, the repository ID, and the block ID.

43. The method of claim 42, further including:
   transmitting the global block ID from the source repository to the target repository, wherein if the target repository determines the global block ID is associated with an existing block of the deduplicated data located within the target repository, the global block ID is transmitted back to the source repository.

44. The method of claim 43, further including, subsequent to the transmitting the global block ID, transmitting, for a block associated with the block ID, a representation enabling data deduplication from the source repository to the target repository, wherein the representation is inserted into a deduplication index within the target repository.

* * * * *